(12) United States Patent
Salkintzis

(10) Patent No.: US 8,467,786 B2
(45) Date of Patent: Jun. 18, 2013

(54) COMMUNICATION DEVICES AND METHODS FOR PROVIDING SERVICES TO COMMUNICATION DEVICES IN A COMMUNICATION SYSTEM INCLUDING A PRIVATE CELL

(75) Inventor: Apostolis Salkintzis, Athens (GR)

(73) Assignee: Motorola Mobility LLC, Libertyville, IL (US)

( * ) Notice: Subject to any disclaimer, the term of this patent is extended or adjusted under 35 U.S.C. 154(b) by 784 days.

(21) Appl. No.: 12/434,743

(22) Filed: May 4, 2009

(65) Prior Publication Data

US 2010/0279684 A1    Nov. 4, 2010

(51) Int. Cl.
*H04W 4/00* (2009.01)
*H04W 36/00* (2009.01)

(52) U.S. Cl.
USPC ........................................... 455/434; 455/436

(58) Field of Classification Search
USPC ................. 455/434, 436, 438, 439, 440, 444, 455/525
See application file for complete search history.

(56) References Cited

U.S. PATENT DOCUMENTS

| | | | |
|---|---|---|---|
| 2004/0233866 A1* | 11/2004 | Bossoli et al. | 370/328 |
| 2007/0105568 A1 | 5/2007 | Nylander et al. | |
| 2008/0227447 A1 | 9/2008 | Jeong et al. | |
| 2008/0293419 A1 | 11/2008 | Somasundaram et al. | |
| 2010/0215018 A1* | 8/2010 | Ejzak | 370/331 |
| 2011/0072101 A1* | 3/2011 | Forssell et al. | 709/206 |

FOREIGN PATENT DOCUMENTS

| | | |
|---|---|---|
| EP | 1947889 A2 | 7/2008 |
| EP | 2169972 A1 | 3/2010 |
| KR | 10-2005-0058333 A | 6/2005 |
| WO | 2004021634 A1 | 3/2004 |

OTHER PUBLICATIONS

Patent Cooperation Treaty, "PCT Search Report and Written Opinion of the International Searching Authority" for International Application No. PCT/US2010/033077 Feb. 2, 2011, 21 pages.
3GPP TS 23.216 V8.3.0 (Mar. 2009); 3rd Generation Partnership Project; Technical Specification Group Services and System Aspects; Single Radio Voice Call Continuity (SRVCC); Stage 2 (Release 8) 34 pages.

(Continued)

*Primary Examiner* — Kent Chang
*Assistant Examiner* — Scott Au

(57) ABSTRACT

A method in a communication device (220) for discovering a private cell (222) accessible to the communication device (220) for communication in a communication system (200) comprises receiving (400) at the communication device (220) cell discovery information. The cell discovery information is based on subscription information of the communication device (220) and includes location information for identifying at least one area of the communication system in which at least one private cell accessible to the communication device for communication is located. The method further comprises initiating (402) a private cell search at the communication device (220) for discovering a private cell accessible to the communication device when the communication device (220) is determined to be located in an identified area. A method of identifying a cell accessible to a communication device (220) in idle mode and registered with an IMS network (214) in a communication system (200) including a private cell (222) is also disclosed. A method of performing a handover of an ongoing service being provided to a communication device (220) when registered with an IMS network (214) in a communication system (200) including a private cell (222) is also disclosed.

7 Claims, 8 Drawing Sheets

OTHER PUBLICATIONS

3GPP TR 23.832 V0.3.0 (Arp. 2009); 3rd Generation Partnership Project; Technical Specification Group Services and System Aspects; ims Aspects of Architecture for Home NodeB; Stage 2 (Release 9) 26 pages.

3GPP TSG SA WG2 Meeting #70, S2-090209 "Architecture for ANDSF in Roaming Case" Huawei, Jan. 12-16, 2009, Scottsdale, Phoenix, USA, 4 pages.

3GPP TSG SA WG2 Meeting #70, TD S2-090233 "eANDSF architecture" Orange, Jan. 12-16, 2009, Scottsdale, Phoenix, USA, 3 pages.

3GPP TSG SA WG2 Meeting #70, TD S2-090271 "Roaming Architecture for AND&S" Motorola, Jan. 12-16, 2009, Scottsdale, Phoenix, USA, 5 pages.

3GPP TSG SA WG2 Meeting #70, TD S2-090304 "ANDSF Architecture Alternatives for Roaming Scenario" Toshiba America Research, Telcordia, Jan. 12-16, 2009, Scottsdale, Phoenix, USA, 4 pages.

3GPP TSG SA WG2 Meeting #70, TD S2-090305 "ANDSF Architecture Alternatives for Roaming Scenario" Toshiba America Research, Telcordia, Jan. 12-16, 2009, Scottsdale, Phoenix, USA, 4 pages.

3GPP TSG SA WG2 Meeting #75, TD S2-095245 "H(e)NB discovery with ANDSF" Motorola, Aug. 31-Sep. 4, 2009, Kyoto, Japan, 2 pages.

Korean Intellectual Property Office, Notice of Preliminary Rejection for Patent Application No. 10-2011-7021719 dated Oct. 9, 2012, 10 pages.

3GPP TSG WG1 #55bis, R1-090328 "Some Results on DL-MIMO Enhancements for LTE-A" Motorola; Ljubjana, Slovenia; Jan. 12-16, 2009, 5 pages.

Mexican Patent Office, First Office Action for Mexican Patent Application No. MX/a/2011/011321, dated Sep. 10, 2012, 4 pages.

* cited by examiner

US 8,467,786 B2

COMMUNICATION DEVICES AND METHODS FOR PROVIDING SERVICES TO COMMUNICATION DEVICES IN A COMMUNICATION SYSTEM INCLUDING A PRIVATE CELL

FIELD OF THE DISCLOSURE

This disclosure relates to communication devices and methods for providing services to communication devices in a communication system including a private cell.

BACKGROUND OF THE DISCLOSURE

3rd generation (3G) systems, such as the Universal Mobile Telecommunication System (UMTS) have been developed and deployed to further enhance the communication services provided to mobile users compared to those communication services provided by the 2nd generation (2G) communication system known as the Global System for Mobile communication (GSM). In such 3G systems, distinct domains or networks have been identified for Radio Access Networks (RANs) which communicate with the mobile devices. These domains include the circuit switched (CS) domain and the packet switched (PS) domain. In the CS domain signals are physically routed to the appropriate destination through a unique connection whereas in the PS domain message packets are routed to the appropriate destination based on addresses in the packet. So for example, a UMTS CS domain is the UMTS RAN (known as UTRAN) and core network components that provide CS services and a UMTS PS domain is the UTRAN and core network components that provide PS services.

Other IP-based communication systems, such as wireless LAN (WLAN), Worldwide interoperability for Microwave Access (Wi-MAX), Wi-Fi, Long Term Evolution (LTE) systems, provide communication via a PS domain. An IP Multimedia Subsystem (IMS) is a subsystem of a communication system that provides IP multimedia services with PS communication (that is, via the PS domain).

As is well known, cellular communication systems, such as UMTS, provide communication to mobile devices via a plurality of cells, with each cell served by one or more base stations. The base stations are interconnected by a fixed network which can communicate data between the base stations. A mobile device communicates via a radio communication link with a base station of the cell within which the mobile station is situated. In UMTS, the base stations which are part of the UTRAN are known as Node Bs and a mobile device is known as User Equipment (UE).

In order to extend coverage and capacity indoors, such as in residential or small business environments and especially where access would otherwise be limited or unavailable, systems with smaller sized cells served by small base stations, known as femtocells, have been developed. The femtocell incorporates the functionality of a typical base station and some network functionality to allow a simpler, self contained implementation. Current femtocell designs can typically support two to four active mobile devices in a residential setting and thus, are typically used for a closed subscriber group (CSG) or private cell where only subscribers in the group may communicate via the femtocell (also known as private base station). Different architectures for femtocells have been proposed. For example, a UMTS femtocell architecture contains a Home Node B (HNB), a 3G HNB Gateway (3G HNB GW), which interfaces with the UMTS PS and CS domains. The third Generation Partnership Project (3GPP) refers to a 3G femtocell as a Home Node B (HNB) and is working currently to complete a new HNB standard for Rel-8 of specifications: see for example, the 3GPP document TS 25.467 (UTRAN Architecture for 3G HNB). In addition, 3GPP is working to specify an enhanced HNB architecture in the context of Rel-9: see for example, the 3GPP documents TR 23.830 and TR 23.832.

3GPP has defined an architecture to support access to the PS domain and to the CS domain of one or more core networks through HNBs. FIG. 1 is a simplified diagram showing one HNB 10 serving a private cell 12, and a Node B (NB) 14 serving a larger cell 16 (referred to as a macro cell). UE 13 communicates with the HNB 10 over a radio communication link 15 and the HNB 10 communicates with a 3G HNB gateway 18 via a Iuh interface 20. NB 14 is coupled to Radio Network Controller (RNC) 22 as is well known in the art. Services are provided to the UE 13 via the CS domain 23 using the Iu-cs interface and the Mobile Switching Centre (MSC) 24. Services are provided to the UE 13 via the PS domain 25 using the Iu-ps interface and the Serving GPRS Support Node (SGSN) 26 and the Gateway GPRS Support Nodes (GGSN) or Packet Data Network Gateway (PGW) 28. For UEs having IMS capability, access to IMS services may be provided using IMS elements of the IMS 27, the Iu-ps interface and the SGSN 26 and the GGSN/PGW 28.

As the architectures for HNB are being developed, solutions for issues such as handover between private and macro cells, terminating service delivery and private cell discovery are needed.

BRIEF DESCRIPTION OF THE DRAWINGS

Communication devices and methods for providing services to communication devices in a communication system including a private cell in accordance with different aspects of the disclosure will now be described, by way of example only, with reference to the accompanying drawings in which.

DETAILED DESCRIPTION OF THE DRAWINGS

The term service as used herein is intended to cover services for the end user of a communication device (e.g. originated or terminated at the communication device) and includes voice calls, video, audio or other multimedia sessions, file delivery services, bulletin board and broadcast notification services like news feed, web-surfing, network gaming, database access, email, SMS or similar services which provide the capability for information transfer. The disclosure will however be described in relation to voice calls for illustrative purposes.

The communication device may be a portable or handheld or mobile telephone, a Personal Digital Assistant (PDA), a portable computer, portable television and/or similar mobile device or other similar communication device. In the following description, the communication device will be referred to generally as a UE for illustrative purposes and it is not intended to limit the disclosure to any particular type of communication device.

Figure 1:
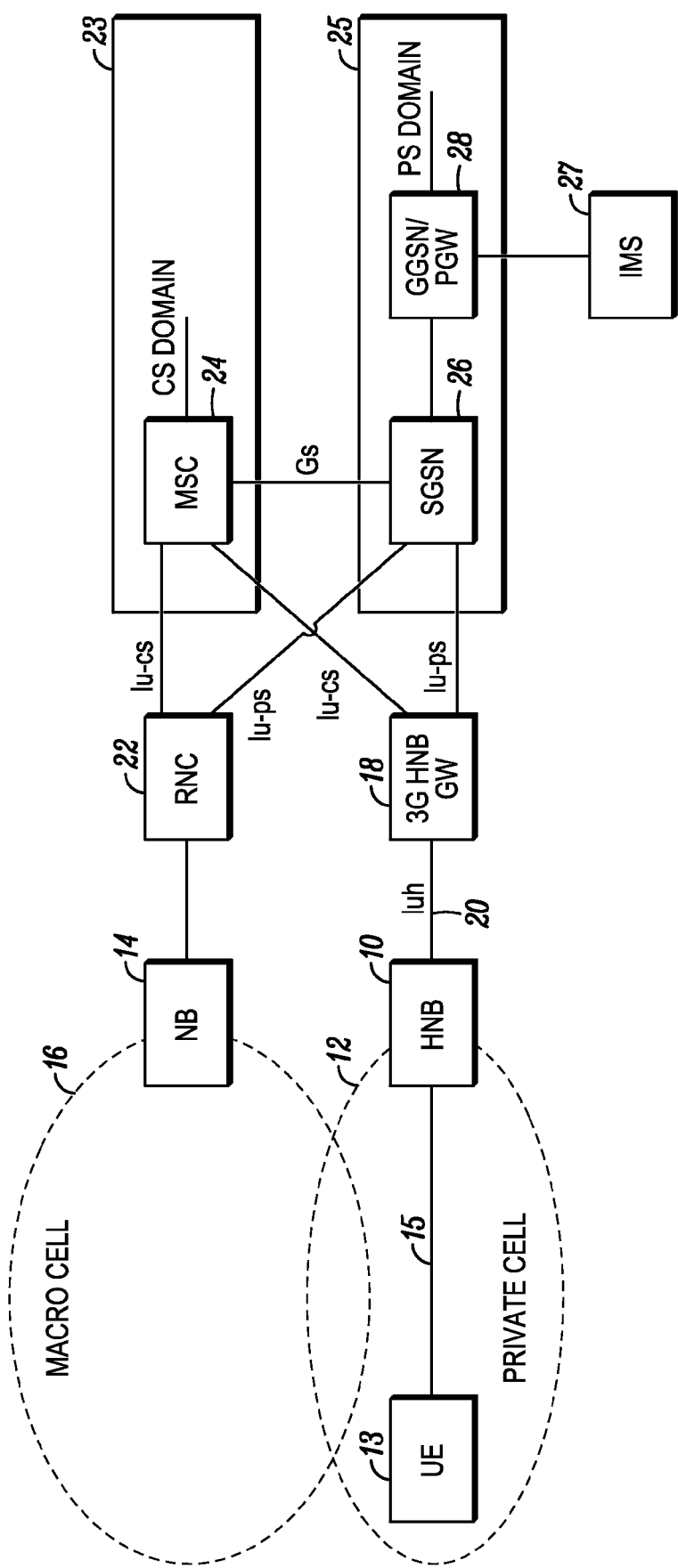
FIG. 1 is a block schematic diagram of a communication system including a Node B and a HNB for providing access to networks including an IMS network.
Figure 2:
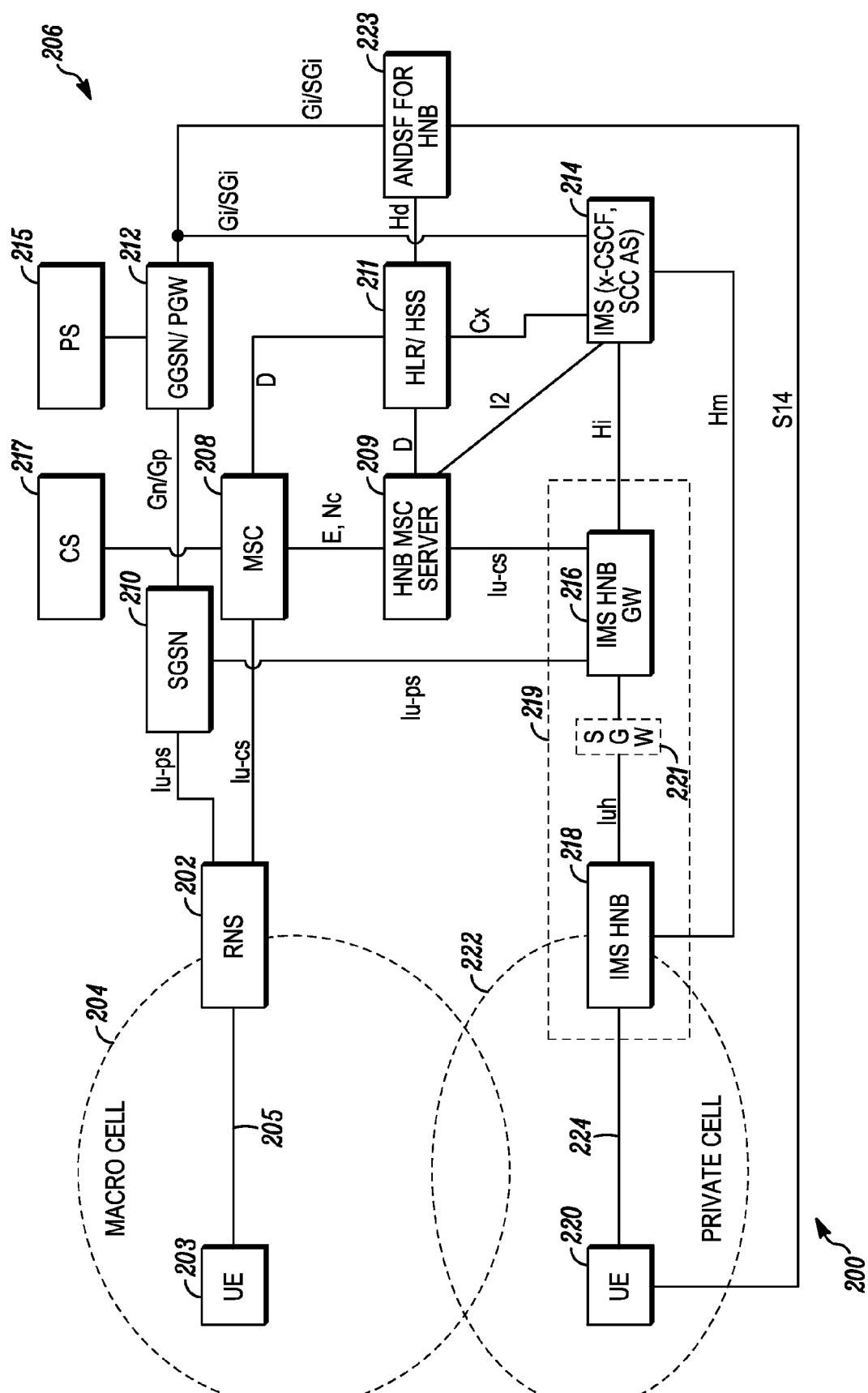
FIG. 2 is a block schematic diagram of a communication system in accordance with an example embodiment of the present disclosure.

Referring now to FIG. 2, a communication system 200 in accordance with an example of an embodiment of the disclosure comprises a core network 206, an IP Multimedia Core Network Subsystem 214 (referred to as IMS network 214) having IMS elements for providing IMS services, at least one packet data network 215, a CS network 217, and Radio Network Subsystem (RNS) 202 including at least one Node B (not shown) and a Radio Network Controller (RNC) (not shown) for serving a macro cell represented by the dotted lines 204. RNS 202 is part of a UTRAN as is well known in the art. A UE 203 may communicate with a Node B of the RNS 202 via a radio communication link 205. The number and types of networks available to a UE is determined by what networks are deployed by the operator of the communication system 200. So, for example, an operator may not deploy a PS network.

The core network 206 manages the radio access networks such as RNS 202 in order to provide services to or from a UE. The services may include IMS services from the IMS network 214 or data services from the packet data network 215. The core network 206 is divided into a plurality of domains including a CS domain, and a PS domain. The CS domain includes a MSC 208 and Iu-cs interfaces and in an embodiment of the disclosure a MSC server enhanced to support IMS HNB 209 (hereinafter referred to as HNB MSC server 209) and the PS domain includes a SGSN 210, GGSN/PGW 212 and Iu-ps interfaces. The core network will also include a Home Location Register/Home Subscriber Server (HLR/HSS) 211 coupled to the MSC 208 and the HNB MSC server 209 via D interfaces. These elements are shared by both the PS and CS domains.

The HNB MSC server 209 is communicably coupled to the IMS network 214 via an interface referred to as an I2 interface. The HLR/HSS 211 is communicably coupled to the IMS network 214 via an interface referred to as an Cx interface.

The HNB MSC server 209 is a control-plane part of a MSC with typical MSC functions such as setting up and releasing an end-to-end connection, handling mobility and handover requirements during a call and taking care of charging. The HNB MSC server 209 is however further arranged to provide additional control-plane functions to support the IMS HNB 218. Some of these additional functions will be apparent from the following. Although not shown in FIG. 2, the HNB MSC server 209 may also have an Iu-cs interface to one or more RNS (not shown in FIG. 2).

FIG. 2 shows a situation where the macro cell 204 is controlled by MSC 208 which is separate to the HNB MSC server 209. Thus, when an ongoing call is handover between the private cell 222 and a macro cell controlled by the HNB MSC server 209, the MSC 208 is not involved. However, when an ongoing call is handover between the private cell 222 and a macro cell 204 which is controlled by MSC 208 and not the HNB MSC server 209 (as shown in FIG. 2), the MSC 208 needs to be involved and a procedure similar to an inter-MSC handover procedure (as per TS 23.009, the disclosure of which is incorporated herein by reference) is performed.

A UE in the macro cell 204 may access the IMS network 214 through the Iu-ps interface, the SGSN 210, GGSN/PGW 212 and Gi/SGi reference point. A UE in the macro cell 204 may access the packet data network 215 through the Iu-ps interface, the SGSN 210, and GGSN/PGW 212. A UE in the macro cell 204 may access the CS network 217 through the Iu-cs interface, and the MSC 208, or through the Iu-cs interface, and the HNB MSC server 209 (although this is not explicitly shown in FIG. 2).

The functions of the MSC 208, SGSN 210 and GGSN/PGW 212 and the interfaces Iu-ps and Iu-cs are well known in the art and no further description of their functions will be provided herein.

The communication system 200 further comprises a communication apparatus 219 comprising a private base station 218 for communicating with a UE 220 of a user authorised to use the private base station 218 and a gateway 216 communicatively coupled to the private base station 218. The UE 220 communicates with the private base station 218 via a radio communication link 224 when the UE 220 is in a private cell 222 served by the private base station 218. The private base station 218 may be a HNB as defined in the 3GPP standards with the private cell 222 being a Closed Subscriber Group (CSG) cell and the gateway 216 being a HNB gateway. In order for the user of the UE 220 to be able to use the HNB 218, the user must be a subscriber to the CSG. In the following to simplify the description, the private base station 218 is referred to as IMS HNB 218, the gateway 216 is referred to as IMS HNB gateway 216 and the communication apparatus 219 comprising the IMS HNB 218 and IMS HNB gateway 216 is referred to as the IMS HNB subsystem 219. It will however be appreciated that the use of this language is not intending to limit the scope of the disclosure.

The IMS HNB gateway 216 may provide access to the IMS network 214 and at least one other communication network. For example in the communication system 200 of FIG. 2, the IMS HNB gateway 216 may provide access to the CS network 217 via the CS domain and/or the packet data network 215 via the PS domain. In order to provide access to the CS network 217, the IMS HNB gateway 216 may communicate with the HNB MSC server 209 over a Iu-cs interface and in order to provide access to the PS network 215, the IMS HNB gateway 216 may communicate with the SGSN 210 over a Iu-PS interface. The IMS HNB gateway 216 is communicatively coupled to the IMS network 214 so as to provide direct access to the IMS network 214 via a reference point or interface referred to as an Hi interface. In addition, the IMS HNB 218 is communicatively coupled to the IMS network 214 via an interface referred to as an Hm interface. The Hi and Hm interfaces may be Session Initiation Protocol (SIP) based interfaces that provide access to the IMS network 214 directly from the IMS HNB subsystem 219. The Hi and Hm interfaces are used by the IMS HNB subsystem 219 to register the UE 220 to the IMS network 214 and to provide services to the UE 220 (originated/terminated by the UE 220) via the IMS network 214 as will be described in more detail below. The Hm interface is a logical SIP signalling interface between the IMS HNB 218 and the IMS network 214. Transport of SIP signalling between the IMS HNB 218 and the IMS network 214 is supported over the Iuh and the Hi interfaces. The Hm interface may for example be implemented by an existing reference point such as that shown in TS 23.228. The Hi interface needs to support only IP transport functionality in order to route signalling and data packets between the IMS HNB subsystem 219 and the IMS network 214. The description of the other interfaces shown in FIG. 2 can be found in TS 23.060 and TS 23.002. The disclosures of these documents are incorporated herein by reference.

In addition, the UE 220 in the private cell 222 may access the IMS network 214 through the Iu-cs interface, the HNB MSC server 209 and the I2 interface as specified in 3GPP TS 23.292 (the disclosure of which is incorporated herein by reference).

The HNB MSC server 209 may also communicate with the MSC 208 over an interface referred to as an E interface. The E interface between the MSC 208 and the HNB MSC server 209 is used to transfer an ongoing service (such as a voice call) from the IMS HNB subsystem 219 to the MSC 208 as will be described in more detail below.

The IMS HNB 218 is arranged to select a route for providing a service to the UE 220 through the IMS HNB 218 and IMS HNB gateway 216, with the route being one of a route between the UE and the IMS network 214 and a route between the UE and at least one other network, such as the CS network 217. The IMS HNB 218 may select the route based on the service to be provided. In other words, the IMS HNB 218 may select the route based on the service originated by the UE 220.

Thus, for example when the IMS HNB 218 receives a request for service from the UE 220, the IMS HNB 218 may determine that the service can be provided by the IMS network 214 and the IMS HNB 218 may then take control of the provision of the service and select a route via the IMS network 214. In the case of a request for a voice call, the IMS HNB 218 takes control of the call from the HNB MSC server 209 and so the HNB MSC server 209 is no longer involved with the call.

Figure 3:
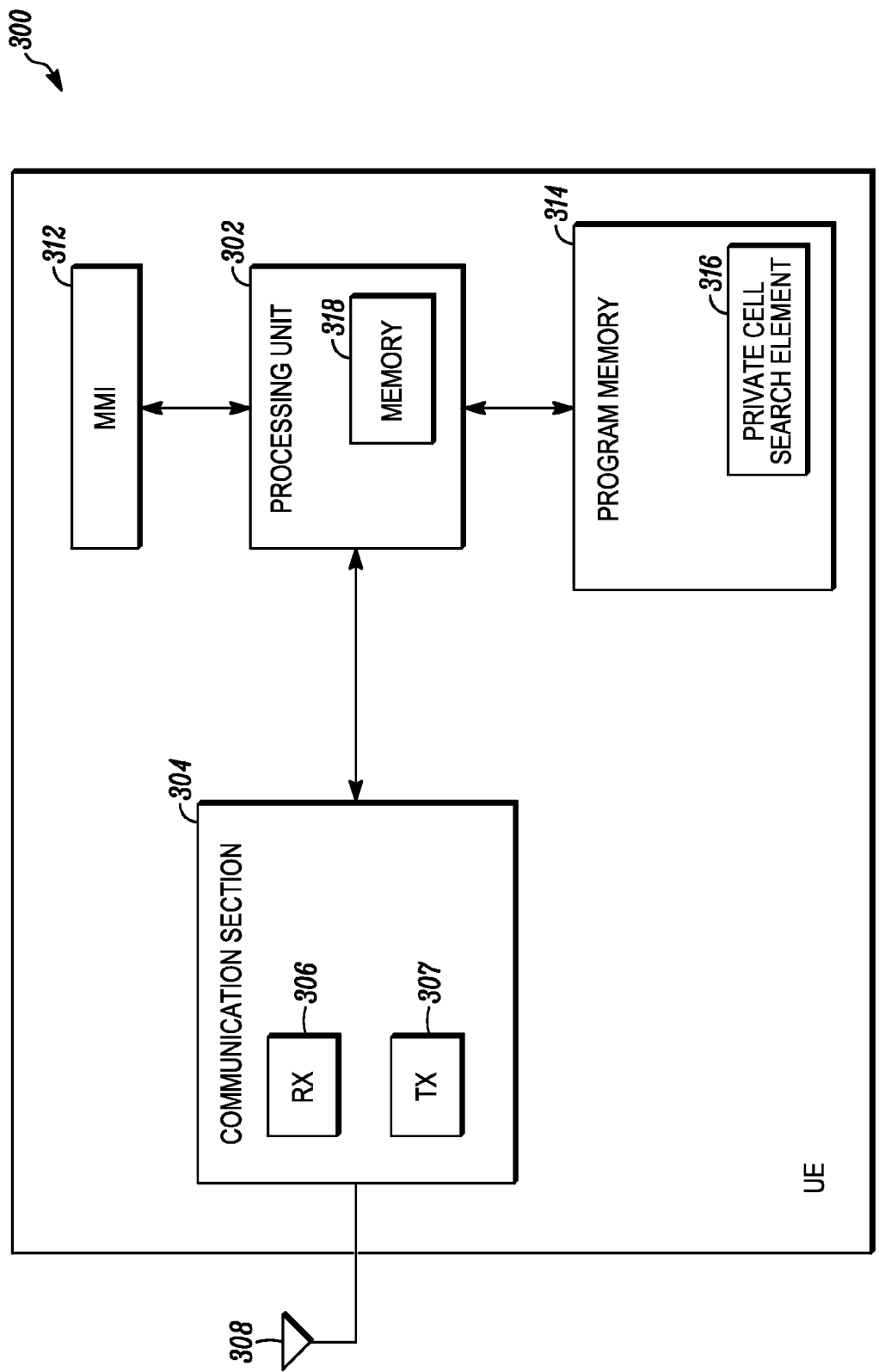
FIG. 3 is a block schematic diagram of a communication device in accordance with an example embodiment of the present disclosure.

FIG. 3 is a block diagram of a communication device 300, such as the UE 220 or 203 shown in FIG. 2, in accordance with an embodiment of the disclosure. In the following description, reference is made to a communication device comprising a UE. As will be apparent to a skilled person, FIG. 3 shows only the main functional components of an exemplary UE 300 that are necessary for an understanding of the invention.

The UE 300 comprises a processing unit 302 for carrying out operational processing for the UE 300. The UE 300 also has a communication section 304 for providing wireless communication via a radio communication link with a serving base station such as HNB 218 of FIG. 2. The communication section 304 typically includes an antenna 308, a receiver 306, a transmitter 307, modulation/demodulation section (not shown), and a coding/decoding section (not shown), for example, as will be known to a skilled person and thus will not be described further herein. The communication section 304 is coupled to the processing unit 302.

The UE 300 also has a Man Machine Interface MMI 312, including elements such as a key pad, microphone, speaker, display screen, for providing an interface between the UE and the user of the UE. The MMI 312 is also coupled to the processing unit 302.

The processing unit 302 may be a single processor or may comprise two or more processors carrying out all processing required for the operation of the UE 300. The number of processors and the allocation of processing functions to the processing unit is a matter of design choice for a skilled person. The UE 300 also has a program memory 314 in which is stored programs containing processor instructions for operation of the UE 300. The programs may contain a number of different program elements or sub-routines containing processor instructions for a variety of different tasks, for example, for: communicating with the user via the MMI 312; and processing signalling messages (e.g. paging signals) received from the core network 206. Specific program elements stored in program memory 314 include a private cell search element 316 for performing a search for accessible private cells for communication with the UE 300. The operation of the private cell search element 316 will be described in more detail below.

The UE 300 further comprises a memory 318 for storing information. The memory 318 is shown in FIG. 3 as being part of the processing unit 302 but may instead be separate to the processing unit 302.

The UE 300, once turned on or powered-up, may be in one of several operating modes in relation to the communication system 200, such as idle mode, or active mode. In the idle mode, the UE 300 is active with (that is, registered to) the communication system 200 but no communication resources have been allocated to the UE 300. In other words, there is no CS or PS or IMS connection between the UE 300 and the communication system so that the UE 300 will not receive or transmit services, video, multimedia or voice data in a voice or data call. In the idle mode, the communication system 200 communicates with the UE 300 by sending signalling information, such as paging signals or blocks to the UE 300 and the UE 300 is arranged to monitor for such signalling information from the communication system. The signalling information includes, for example, information that alerts the UE 300 to an incoming call, or information that provides system parameters to the UE 300 for determining the operation of the UE when operating with the communication system.

In the active mode, communication resources are allocated to the UE 300 and a CS or PS or IMS connection is established between the UE 300 and the active network in the communication system 200 which allows for the UE 300 to transmit or receive services.

In many deployment scenarios, a UE in idle mode does not receive information from its serving cell (such as macro cell 204) about neighbouring private cells (such as private cell 222). Therefore, the UE is typically required to perform a periodic autonomous search in idle mode for discovering available private cells: that is one or more private cells that are accessible to the UE for communication. However, such a search consumes power and thus has an impact on battery consumption.

The inventor of the subject application has developed a technique for discovering a private cell accessible to an UE device for communication which does not require periodic autonomous searches and hence power consumption can be minimised.

Figure 4:
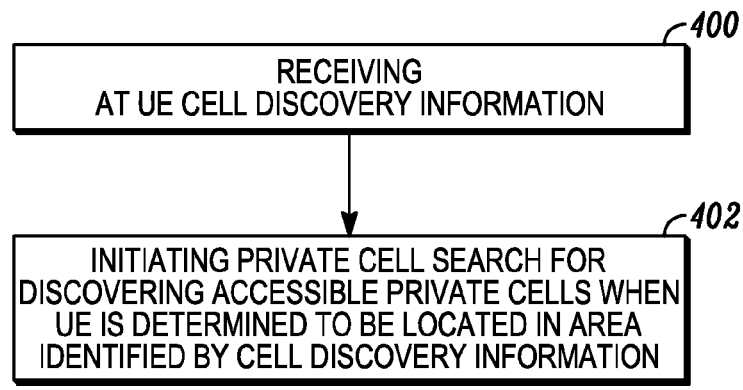
FIG. 4 is a flow diagram showing an example method of discovering a private cell accessible to a communication device for communication in accordance with an embodiment of the disclosure.

FIG. 4 shows an example method for discovering a private cell accessible to a UE (such as UE 300) for communication in accordance with an embodiment of the disclosure. The example method comprises receiving at the receiver 306 of the UE 300 cell discovery information, step 400. The cell discovery information is based on subscription information of the UE 300 which subscription information indicates, for example, which private cells the user of the UE 300 is allowed to access, and the cell discovery information includes location information for identifying at least one area of the communication system 200 in which at least one private cell (e.g. private cell 222) accessible to the UE 300 for communication is located. The method further comprises initiating or triggering a private cell search at the UE 300 for discovering a private cell accessible to the UE when the UE is determined to be located in an identified area, step 402. The step of initiating a private cell search may be initiated by the UE 300 when it is determined that the UE 300 is located in an identified area having at least one private cell accessible to the UE 300. The UE 300 may determine its location either directly from a GPS located in the UE 300 or from location information received at the UE 300 from the communication system 200, for example, from location information received which indicates the identity of the UE's serving cell or the UE's serving location area. The private cell search may be carried out by the processing unit 302 under the control of the private cell search element 316. A private cell search entails scanning a range of carrier frequencies and identifying one or more private base stations operating on these frequencies.

The communication system 200 is arranged to provide communication over a plurality of areas. Each of the plurality of areas includes at least one macro cell served by at least one base station and at least one of the plurality of areas includes at least one private cell served by a private base station. For example, an operator of the communication system 200 may define a plurality of Location Areas (LAs) (or Tracking Areas (TAs), when the UE is using LTE), with each LA including a group of macro cells and at least some of the LAs including one or more private cells. Each of the LAs is assigned a Location Area Identity (LAI). The cell discovery information provided to the UE 300 may therefore include location information or identity information for each of the LAs in which is located at least one private cell accessible to the UE. Alternatively or additionally, the plurality of areas may include a plurality of macro cells with at least some of the areas (or macro cells) including at least one private cell.

The cell discovery information may be received at the receiver 306 from the communication system 200 in response to a request sent by the UE 300 to the communication system 200. For example, a request for cell discovery information may be sent by the UE 300 under the control of the processing unit 302 on turn-on or power-up of the UE 300.

The cell discovery information may be stored in memory 318 of the UE 300.

The method may further comprise receiving validity information at the UE 300 associated with the cell discovery information. The validity information may indicate a validity parameter for the associated received cell discovery information which may include information indicating the cell discovery information is valid for a predetermined period of time, such as one day, or that the cell discovery information is valid for the whole of the communication system 200 or for some LAs of the communication system 200. If validity information is received at the UE 300, then the request for cell discovery information may be sent by the UE 300 based on the validity parameter. In other words, once the validity information indicates that the cell discovery information is no longer valid, the UE 300 may be arranged to send a request to the communication system 200 for 'new' or 'up-to-date' cell discovery information and to then receive and store the 'new' or 'up-to-date' cell discovery information. This may be useful when the communication system 200 wants to change the cell discovery information so that by limiting the time period for which the cell discovery information is valid, the UE 300 is triggered to request 'new' cell discovery information and up-to-date cell discovery information may be provided to the UE 300.

The cell discovery information is provided to the UE 300 by a function or application run on a server in the communication system 200. In an example embodiment, the server or function may be part of the core network 206 which is serving the UE 300 (e.g. part of the Home Public Land Mobile Network (H-PLMN) when the UE is not roaming or the Visiting Public Land Mobile Network (V-PLMN) when the UE is roaming) and may be a server supporting Access Network Discovery Selection Function (ANDSF). In the arrangement of FIG. 2, an ANDSF for discovery of the IMS HNB 218 is provided by ANDSF for HNB 223. If the UE 300 is ANDSF capable, the UE may then exploit the ANDSF functionality in discovering the accessible private cells in a power efficient way that does not require the UE 300 to perform autonomous periodic searches for accessible private cells. In other words, the UE 300 may query the ANDSF for HNB 223 via a S14 interface (as defined in TS.402, the disclosure of which is incorporated herein by reference) for available private cells and the ANDSF for HNB 223 may provide access discovery information describing the area or areas in which there are available private cells for this UE 300. In this way, the UE 300 can trigger the private cell search only when it is located in an area identified by the ANDSF for HNB 223. An advantage of doing so is that the autonomous private cell search in the UE 300 does not need to run periodically but only when it is likely to discover an available private cell. This can result in minimising battery consumption, especially when the ANDSF access discovery information is stored in the UE 300 and thus frequent ANDSF transactions are avoided.

In an example implementation, the UE 300 may implement the ANDSF discovery procedure specified in TS 23.402 (Rel-8 and Rel-9 specifications, the disclosure of which is incorporated herein by reference) and discover an available ANDSF (such as ANDSF for HNB 223) in the serving network (H-PLMN when the UE is not roaming, or V-PLMN or possibly H-PLMN when the UE is roaming). Subsequently, the UE 300 may perform an ANDSF query as specified in TS 23.402, clause 8.5.1, via the S14 interface, which query may include the current UE location. As part of the UE capabilities included in the query message, the UE indicates that it is CSG capable. The ANDSF for HNB 223 in the serving network queries the HLR/HSS 211 via an interface Hd to find out the subscription information for this UE and then it returns a response message to the UE via the S14 interface including the cell discovery information. The cell discovery information may include the macro cell identities and/or Location/Tracking Area Identities in which there are private cells available for this UE. The ANDSF for HNB 223 in the network may maintain a database indicating which private cells are included in every macro cell and/or Location/Tracking Area.

The impact on the UE 300 to enable ANDSF-assisted HNB discovery can be minimized since the OMA DM protocol used between the UE 300 and the CSG Server (not shown in FIG. 2) is reused for communication between the UE 300 and the ANDSF for HNB 223 in the communication system 200. The CSG server is a functional element in the HNB architecture specified in 3GPP specifications (e.g. TS 24.301, TR 23.830, the disclosure of which is incorporated herein by reference) that is used to provide to UE 300 an updated list of accessible CSG identities, e.g. when the user subscribes to new CSG identities. This way, the UE 300 can know which CSG cells it is allowed to access.

Figure 5:
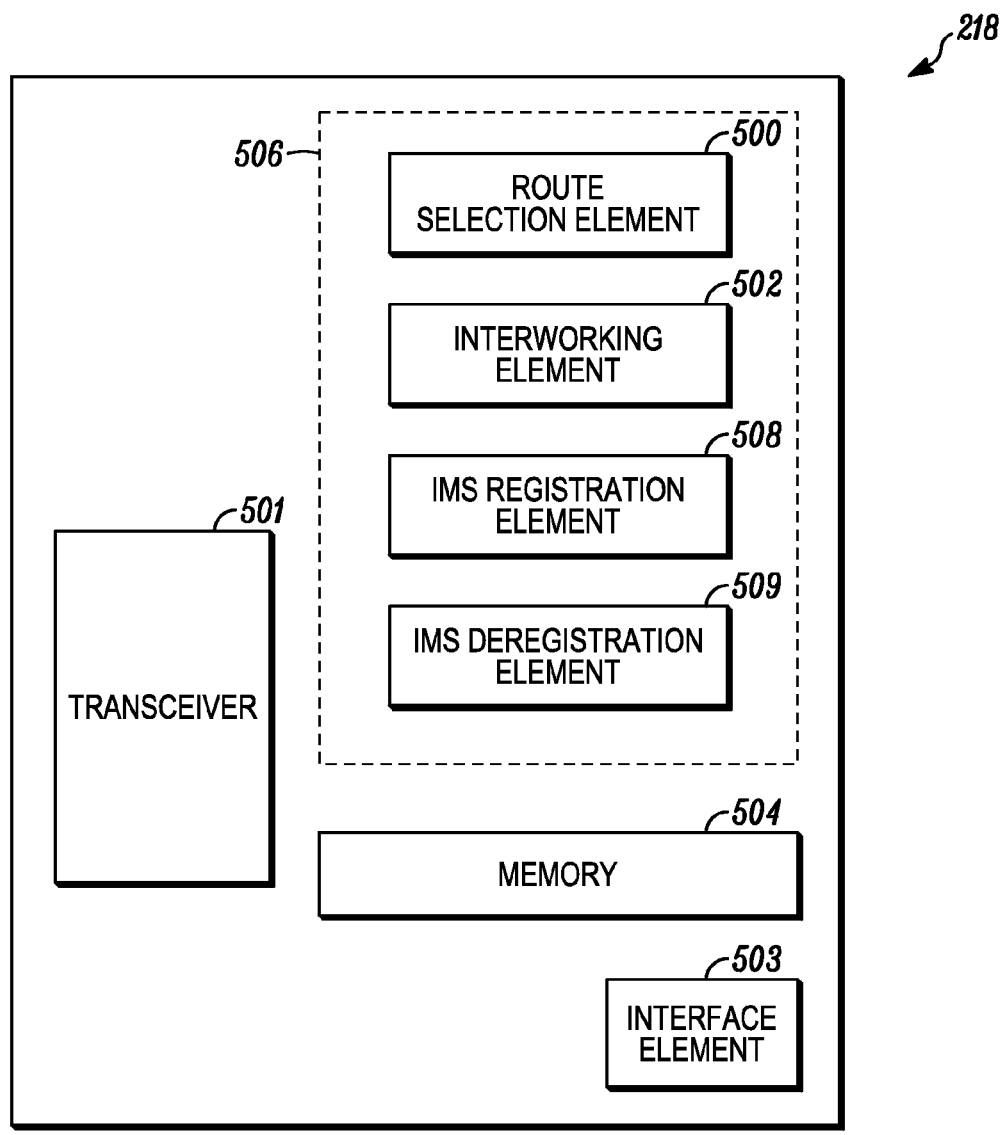
FIG. 5 is a block schematic diagram of a private base station in accordance with an example of an embodiment of the present disclosure for use in the communication system of FIG. 2.

Refer now to FIG. 5 which shows a simplified schematic diagram of an example implementation of IMS HNB 218 in accordance with an embodiment of the disclosure. IMS HNB 218 includes a transceiver 501 for receiving and transmitting signalling between the UE 220 and the IMS HNB 216, for example over the radio communication link 224, an interface element 503, which is part of an interface (referred to as Iuh) between the IMS HNB 218 and the IMS HNB gateway 216 for transporting IP packets between the IMS HNB gateway 216 and IMS HNB 218, a route selection element 500 for selecting a route for providing a service, an interworking element 502 for providing interworking functionality that interworks the UE signalling over the radio communication link 224 (such as the CS signalling as defined by TS 24.008, the disclosure of which is incorporated herein by reference) with the IMS signalling over the Hm interface, an IMS registration element 508 and a memory 504. The functionality of the interworking element 502 may be similar to the interworking functionality provided by an MSC Server enhanced for IMS Centralised Services (ICS), as specified in TS 23.292, the disclosure of which is incorporated herein by reference. A function of the interworking element 502 may include translating the IMS signalling to the CS signalling used by the UE. The IMS registration element 508 is arranged to provide an IMS identity for a UE, register the IMS identity with the IMS network 214 and store IMS registration information in the memory 504. Other UE related information such as International Mobile Subscriber Identity (IMSI), security keys, Temporary Mobile Subscriber CS identity (TMSI), etc may also be stored in the memory 504. The IMS registration information facilitates the IMS HNB 218 in providing a service to the UE via the IMS network 214 and the Hm interface.

The IMS HNB subsystem 219 may further comprise an IMS deregistration element 509 for initiating IMS deregistration whereby the IMS identity of the UE 220 is deregistered with the IMS network 214 after the UE 220 leaves the private cell 222 defined by the IMS HNB 218. The IMS deregistration process may also include the IMS registration information for the UE 220 being deleted from the memory 504 of the IMS HNB 218. The IMS HNB 218 may include an IMS deregistration element 509 as shown in FIG. 5

The Iuh interface between the IMS HNB 218 and IMS HNB gateway 216 supports secure IP packet transport between the IMS HNB 218 and IMS HNB gateway 216. The Iuh interface is defined in the current 3GPP specifications such as TS 25.467, 25.468, 25.469, the disclosures of which are incorporated herein by reference.

The IMS HNB gateway 216 is arranged to provide secure IP transport functionality between the IMS HNB 218 and IMS HNB gateway 216. The IMS HNB gateway 216 does not implement any SIP or other application layer signalling.

The IMS HNB subsystem 219 may further comprise a Security GateWay (SGW) element 221 which is used to verify whether an IMS HNB is authentic and authorised to communicate with the IMS HNB gateway 216.

As indicated above, when an UE in idle mode moves into the private cell 222 served by the IMS HNB 218 in order that the communication system 200 may communicate to provide a service to the UE (e.g. direct a voice call to the UE) via the IMS HNB 218, the communication system 200 is notified of the location of the UE in the private cell 222 so that subsequent services for the UE may be directed to the UE via the private cell 222. The UE may, for example, then be registered with the IMS network 214 via the IMS registration element 508. Similarly, the communication system 200 may be notified when the UE moves out of the private cell 222 and into the macro cell 204 so that the communication system 200 knows to direct any future services to the UE via the macro cell 204 and not the IMS HNB 218. The notification to the communication system 200 when the UE moves into or out of a private cell typically takes place via a Location Area Update (LAU) process. A LAU process is typically initiated by the UE sending a LAU request when it determines that the LAI of the LA in which the UE has been located and which LAI is stored in memory 318 of the UE differs from the LAI now being received by the UE.

The Location Area Update process is well known (see for example TS 23.060, the disclosure of which is incorporated herein by reference) and requires signalling or control messages to be sent between the UE and different elements in the communication system 200. In a communication system 200 with many different private cells and UEs, the Location Area Update processes require a significant amount of signalling which consumes radio resources.

In the case of Mobile Terminating (MT) voice call request received from a remote UE for a UE that has been registered in a private cell served by IMS HNB, it also known to send paging messages first to the private cell in which the UE was last located and if no response is received after a certain time, then paging messages are sent to neighbouring macro cells. This type of sequential paging procedure can take a long time. In addition, if no response is received from the UE to paging messages sent via the private cell, then the UE is typically deregistered from the IMS network 214. However, the UE may not respond to the paging messages even though it may still be located in the private cell, for example due to the UE being temporarily unavailable rather than having moved out of the private cell. Thus, the UE may be deregistered unnecessarily. In accordance with a second aspect of the disclosure, there is provided a method of identifying a cell accessible to a UE for communication and of providing a service to the UE via the identified cell in a communication system having a plurality of cells arranged in a plurality of location areas (LAs), each location area LA including at least one macro cell (such as macro cell 204) served by a base station and at least one private cell (such as private cell 222) served by a private base station (such as IMS HNB 218). The base stations (i.e. the private base station 218 and the base station for the macro cell) are controlled by a Mobile Switching Centre, MSC, (such as HNB MSC server 209) and the at least one private cell 222 is arranged for providing a communication link between the UE and an IMS network (such as IMS network 214).

The UE is registered with (or attached to) the IMS network 214 by the IMS HNB 218 by means of the IMS registration element 508 as described above.

In FIG. 2, the macro cell 204 is controlled by MSC 208. The HNB MSC server 209 may control the private cell 222 and macro cells (not shown in FIG. 2).

Figure 6:
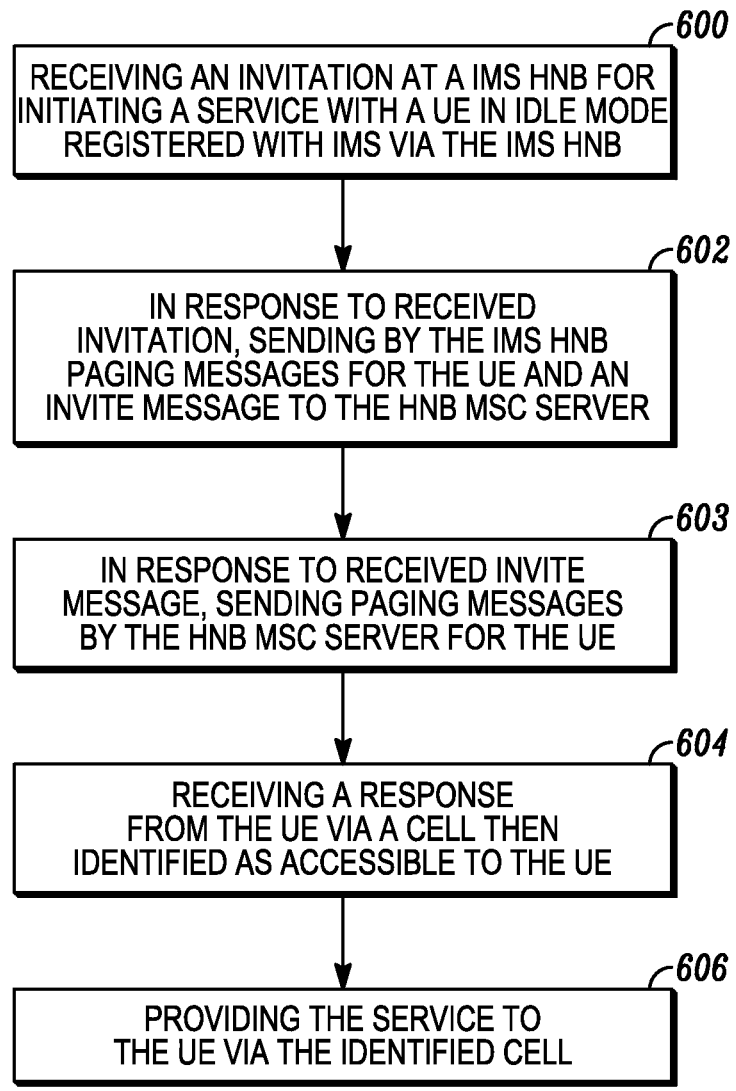
FIG. 6 is a flow diagram showing an example method of identifying a cell accessible to a communication device for communication and of providing a service to the communication device via the identified cell in accordance with an embodiment of the present disclosure.

FIG. 6 shows an example method in accordance with an embodiment of the second aspect of the disclosure for use in a communication system such as that shown in FIG. 2. The example method comprises, when an UE is in an idle mode in a location area having a private base station (e.g. IMS HNB 218) by which the UE is registered with the IMS network 214, receiving an invitation for initiating a service with the UE at the IMS HNB 218 (step 600), in response to receiving the invitation, sending by the IMS HNB 218 paging messages for the UE via the private cell 222 served by the IMS HNB 218 and an invite message to the HNB MSC server 209 (step 602), in response to receiving the invite message, sending paging messages by the HNB MSC server 209 for the UE via the at least one macro cell (not shown in FIG. 2) controlled by the HNB MSC server 209(step 603), receiving a response to the paging message from the UE via one of the private cell 222 and the at least one macro cell, the one of the at least some of the plurality of cells then being identified as a cell accessible to the UE for communication (step 604) and providing the service to the UE via the identified cell (step 606).

As indicated above, the communication system 200 is typically arranged for providing communication over a plurality of cells arranged in a plurality of LAs, each of the plurality of LAs including at least one macro cell served by at least one base station and at least one of the plurality of areas includes at least one private cell served by a private base station. When the UE has registered to IMS via a private cell that uses an IMS HNB (e.g. IMS HNB 218 of private cell 222), then a Mobile Terminated (MT) service request for this UE would trigger an invitation message to be received at the IMS HNB 218. In response, the IMS HNB 218 would page the UE but the UE may not respond if it has previously moved to a macro cell in the same LA (i.e. when no Location Area Update will have been performed). With the method in accordance with the second aspect of the disclosure, the UE is paged both in the macro cell and the private cell 222. Paging messages for the UE may therefore be sent in all cells in the same LA.

Thus, the method in accordance with the second aspect of the disclosure enables the UE to be paged in both the private cell and the macro cell and so there is no need for the UE to perform a LAU when re-selecting between a private cell and a macro cell that belong to the same LA. This reduces the signalling and hence reduces the radio resources required for mobility management to/from private cells.

Furthermore, since the UE is paged in both the private cell and the macro cell substantially simultaneously as part of the same paging process, the time required to page the UE in the different cells is significantly reduced compared to the prior art sequential paging procedure.

In the following description, another example of the method of identifying a cell accessible to a UE for communication and of directing a service to the UE via the identified cell in accordance with the second aspect of the disclosure will be described in more detail with reference to the procedures that take place when the invitation for initiating a service is a Mobile Terminated (MT) voice call request and the UE 220 is in idle mode and is registered to IMS network 214 through the IMS HNB 218.

In the following, it is assumed that the MT voice call request arrives via IMS network 214. When a MT voice call request arrives through the CS domain, then, either the call can be delivered to the UE 220 by using the normal CS call control procedures (via Iu-cs), or the call can be redirected to IMS by using e.g. CAMEL triggers. The UE 220 can be provisioned with Terminating CAMEL Subscription Information in the HLR/HSS 211 so that, when a MT call arrives at the HNB MSC server 209, a forwarding number is obtained from GSM Service Control Function (gsmSCF) and the HNB MSC server 209 forwards the call to this number, which points to an element in the IMS network 214. It is also assumed that when the MT voice call request arrives, the UE 220 may still be in the coverage of the private cell 222 or may have moved to a macro cell (not shown in FIG. 2) controlled by the HNB MSC server 209. It is also assumed that the UE 220 does not perform a LAU when it reselects a macro cell that is controlled by the HNB MSC server 209. However, if the UE reselects a macro cell that is controlled by an MSC 208 (i.e. a MSC other than the HNB MSC server 209), then the UE 220 does a LAU in order to get attached to this 'new' MSC 208. The UE 220 determines that the selected macro cell is controlled by an MSC other than the HNB MSC server 209 by means of information provided to the UE 220 from the base station serving the selected macro cell.

Figure 7:
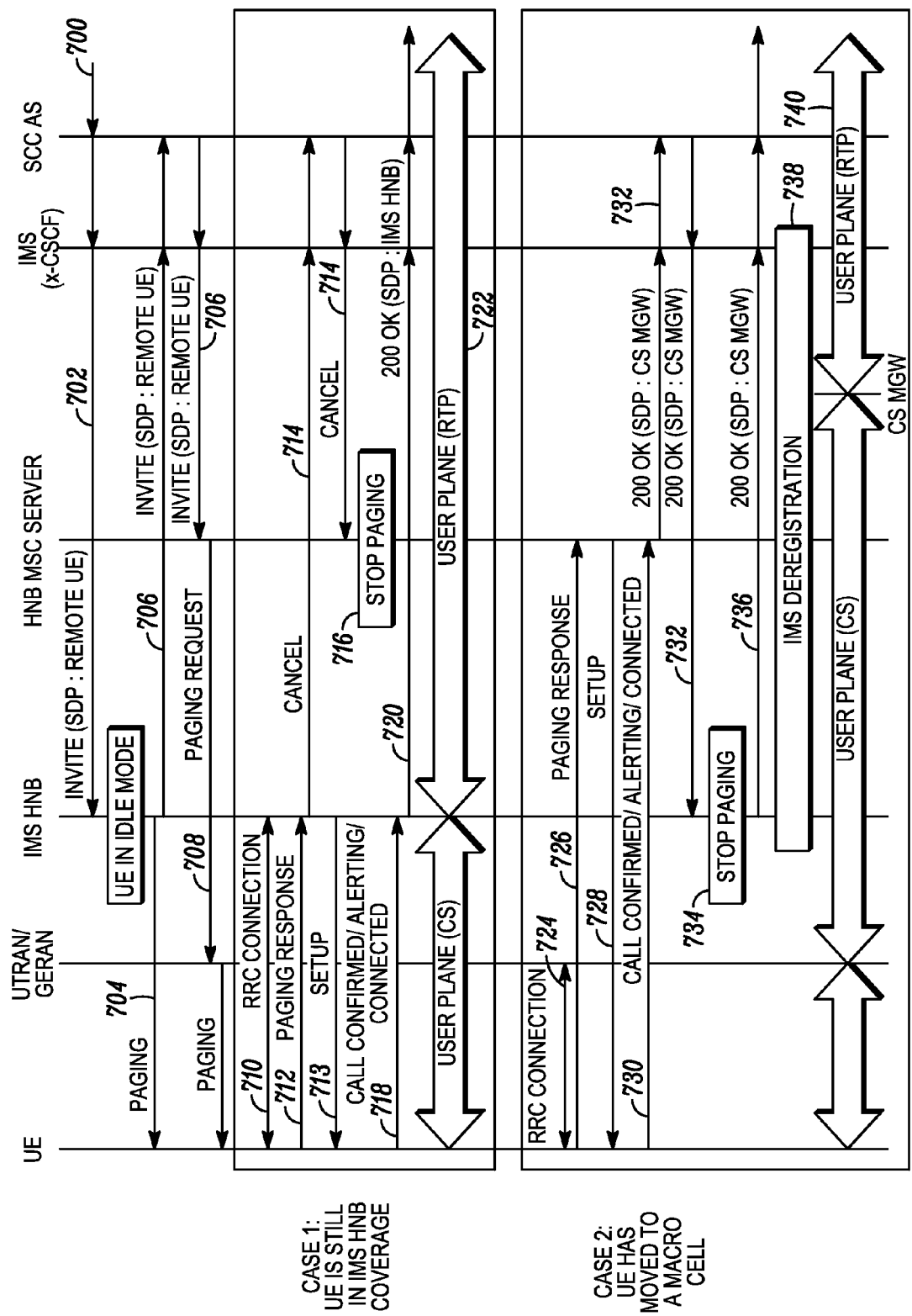
FIG. 7 is a diagram showing an example message flow for providing a voice call service according to the method shown in FIG. 6 in the communication system of FIG. 2.

Referring now to FIG. 7 which shows the main steps involved when a MT voice call service request is received for a UE in the communication system 200 shown in FIG. 2.

A new MT voice call request is received from a remote UE, at step 700, by a Service Centralisation Continuity Application Server (SCC AS) which is not shown in FIG. 2 but which may be part of the core network 206 or another part of the communication system 200. After invoking the terminating access-domain selection (T-ADS) function, the SCC AS decides to route the request to the IMS HNB contact address, at step 702. Since the UE 220 is in idle mode, the IMS HNB 218 starts paging the UE 220 by sending paging messages according to the normal CS paging procedures, step 704.

Since the UE 220 is in idle mode, the IMS HNB 218 does not know if the UE 220 is still in the coverage area (private cell 222) of the IMS HNB 218 or if it has reselected to a neighbour macro cell controlled by the HNB MSC server 209. The IMS HNB 218 then sends a new INVITE request to the HNB MSC server 209 in order to start paging the UE also in the neighbour macro cells, step 706. For example, the HNB MSC server 209 via an RNS of UTRAN/GERAN sends paging messages to the UE 220 via one or more macro cells according to the normal CS paging procedures, step 708.

If the UE 220 is still in the private cell 222 served by IMS HNB 218 as per case 1 of FIG. 7, the UE 220 establishes a Radio Resource Control (RRC) connection with the IMS HNB 218, step 710 and responds to the paging messages sent in step 704 via the private cell 222, step 712. Subsequently, the normal call control messages (as per TS 24.008, the disclosure of which is incorporated herein by reference) are exchanged between the UE 220 and the IMS HNB 218, in order to setup the voice call, steps 713, 718.

After the IMS HNB 218 finds out that the UE 220 is still in the private cell 222 served by the IMS HNB 218 (e.g. after establishing the RRC connection or after receiving the paging response from the UE), the IMS HNB 218 sends a CANCEL message to cancel the INVITE request sent in step 706 to the HNB MSC server 209, step 714. As a result, the HNB MSC server 209 stops paging the UE 220 in the macro cell, step 716.

After the IMS HNB 218 receives the CONNECTED message from the UE 220 (i.e. the user has answered the call), step 718, the IMS HNB 218 responds at step 720, with a 200 OK to the INVITE received in step 702.

The user plane is setup as normal, and voice communication between the UE 220 and the remote party is established, step 722.

If instead the UE 220 has reselected a macro cell as per case 2 of FIG. 7, the UE 220 establishes an RRC connection with the RNS of the UTRAN/GERAN, step 724 and responds at step 726 to the paging sent in step 708. Subsequently, the normal call control messages (as per TS 24.008) are exchanged between the UE 220 and the HNB MSC server 209, in order to setup the voice call, steps 728, 730.

When the HNB MSC server 209 finds out that the UE 220 is in a macro cell (e.g. when receiving the paging response or when the call is connected) at step 730, the HNB MSC server 209 responds to the IMS HNB 218 with a message at step 732 that stops paging in the IMS HNB 218, step 734. For example, the HNB MSC server 209 responds with a 200 OK after the call is connected.

The IMS HNB 218 responds to the INVITE received in step 702 with a 200 OK message, at step 736. The session description protocol (SDP) in this message contains the media address of the CS domain media gateway (CS MGW), so that subsequent voice traffic flows between the remote party and the CS MGW.

The IMS HNB 218 may trigger IMS deregistration via IMS deregistration element 509 to deregister the UE 220 from IMS network 214, at step 738. Before deregistration however, the session leg between the HNB MSC server 209 and the SCC AS (established in step 732) is bound to the remote leg, between the remote party and the SCC AS.

The user plane is setup as normally and voice communication between the UE 220 and the remote party is established through the CS domain, step 740.

The above description refers to the UE moving from a private cell 222 to a macro cell (not shown in FIG. 2). It will however be appreciated that the method of identifying an accessible cell in accordance with the disclosure may also be used when the UE moves from a macro cell to a private cell 222 or even (although a less likely situation) when a UE moves from one private cell to another private cell.

When an UE is active, that is being provided with an ongoing service, and subsequently moves cells (e.g. moves from private cell 222 to macro cell 204), a handover of the ongoing service is performed from the private cell 222 to the macro cell 204. Typically, special interfaces and signalling is required to handover an ongoing call from a private cell to macro cell of UTRAN/GERAN. For example, for handover of voice calls from an IMS HNB to UTRAN/GERAN, a modified or enhanced Iu-cs interface and signalling is required (i.e. the Iu-cs signalling needs to be enhanced in order to allow the IMS HNB 218 to send all the necessary information to the HNB MSC server 209). A handover solution that requires an enhanced Iu-cs interface is shown in TR 23.832 v0.3.1, clause 6.3. Providing 'enhanced' interfaces can mean an increase in cost of systems which support private cells and thus, manufacturers are looking at ways to avoid the need for such 'enhanced' interfaces.

Figure 8:
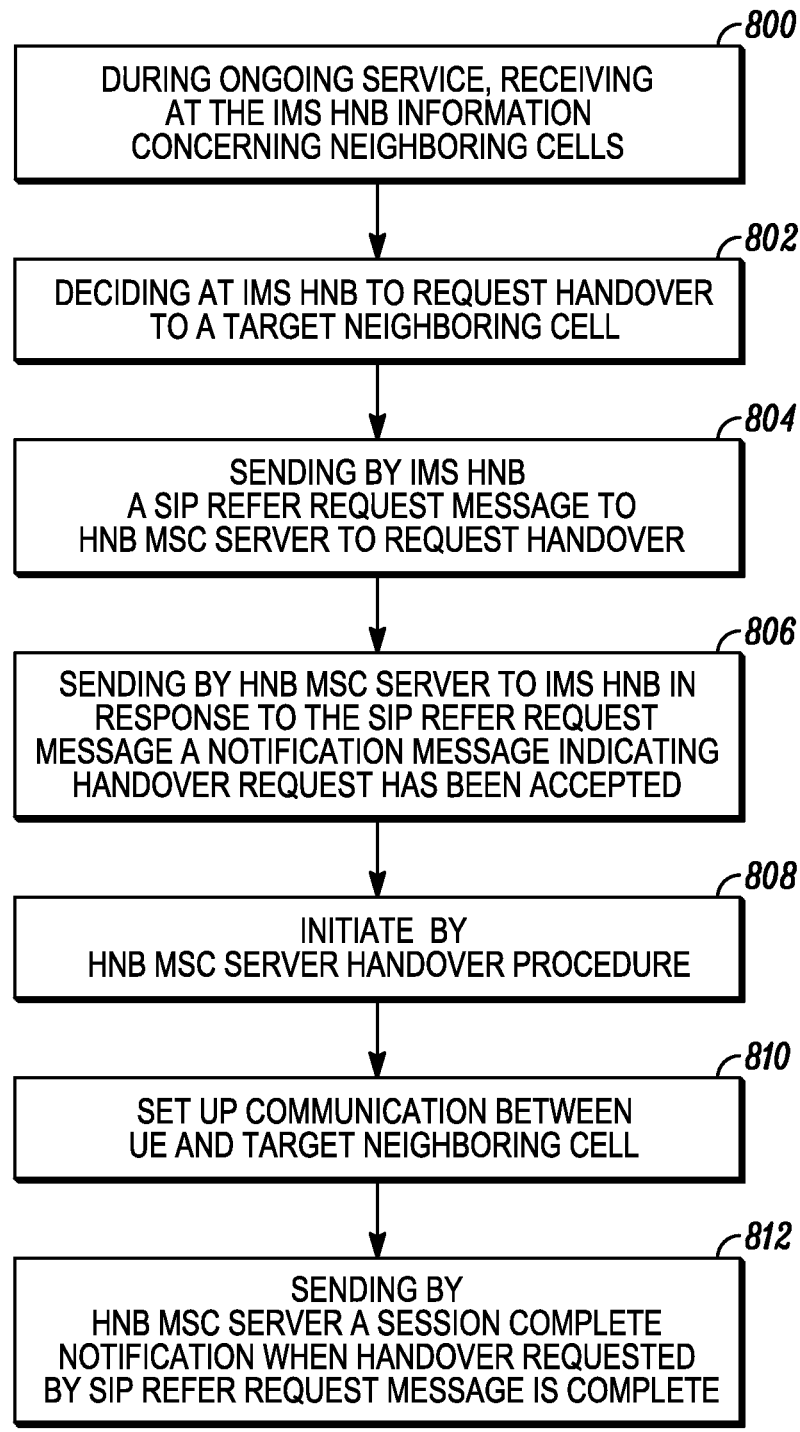
FIG. 8 is a flow diagram showing an example method of performing a handover of an ongoing service being provided to a communication device in accordance with an embodiment of the present disclosure.

In accordance with a third aspect of the disclosure, there is provided a method of performing a handover of an ongoing service being provided to a communication device in a communication system, such as communication system 200 of FIG. 2, comprising an IMS network 214, at least one other communication network, such as a CS network 217 or a PS network 215, a private base station (such as IMS HNB 218) for communicating with a UE authorised to use the IMS HNB 218 and a MSC (such as HNB MSC server 209) communicatively coupled to the IMS HNB 218, to the IMS network 214 so as to provide access to the IMS network 214 and to the at least one other network 215, 217 so as to provide access to the at least one other network. FIG. 8 shows an example method of performing a handover in accordance with a third aspect of the disclosure. When an ongoing service is being provided between the UE and the IMS network 214 via the IMS HNB 218, and the UE moves from a private cell 222 defined by the IMS HNB 218 to a neighbouring cell (e.g. macro cell 204) defined by at least one other communication network, the method comprises receiving at the IMS HNB 218 information concerning neighbouring cells defined by at least one other communication network, step 800, deciding by the IMS HNB 218 to request a handover of the ongoing service to a target neighbouring cell based on the received information, step 802, and sending by the IMS HNB 218 to the HNB MSC server 209 a Session Initiation Protocol (SIP) request message to request a handover of the ongoing service to the target neighbouring cell. The SIP request message is for triggering the HNB MSC server 209 to send notification messages to the IMS HNB 218 concerning the progress of the handover and includes information to facilitate handover of the ongoing service, step 804. In an example and as described in the following, the SIP request message is a SIP REFER request message but the SIP request message may be any type of SIP request message that triggers the HNB MSC server 209 to send notification messages to the IMS HNB 218 concerning the progress of the handover and which includes information to facilitate handover of the ongoing service. The SIP REFER request message may include identification information of the ongoing service (e.g. Session Transfer Number for a Single Radio Voice Call Continuity (STN-SR) specified in 3GPP 23.237, the disclosure of which is incorporated herein by reference) and identification information of the target neighbouring cell. The HNB MSC server 209 then sends to the IMS HNB 218 in response to the SIP REFER request message a notification message to indicate the handover request has been accepted, step 806 and initiates a handover to transfer the ongoing service to the target neighbouring cell, step 808. Communication between the UE and the target neighbouring cell is then set up in response to a notification message generated by the HNB MSC server 209, step 810 and the HNB MSC server 209 sends to the IMS HNB 218 a session complete notification when the handover requested by the SIP REFER request message is complete, step 812.

The UE is registered with (or attached to) the IMS network 214 by the IMS HNB 218 by means of the IMS registration element 508 as described above.

An example method in accordance with the third aspect of the invention will be described in relation to a handover of an ongoing service from a private cell to a macro cell. It will however be appreciated that the method in accordance with the third aspect may also be used in relation to a handover of an ongoing service from a macro cell to a private cell.

Thus, the method in accordance with a third aspect of this disclosure supports mobility of ongoing services to macro cells by using direct SIP signalling between the IMS HNB 218 and the HNB MSC server 209. By using such direct SIP signalling, there is no impact on the Iu-cs interface nor is additional signalling required to perform a handover to a macro cell.

Figure 9:
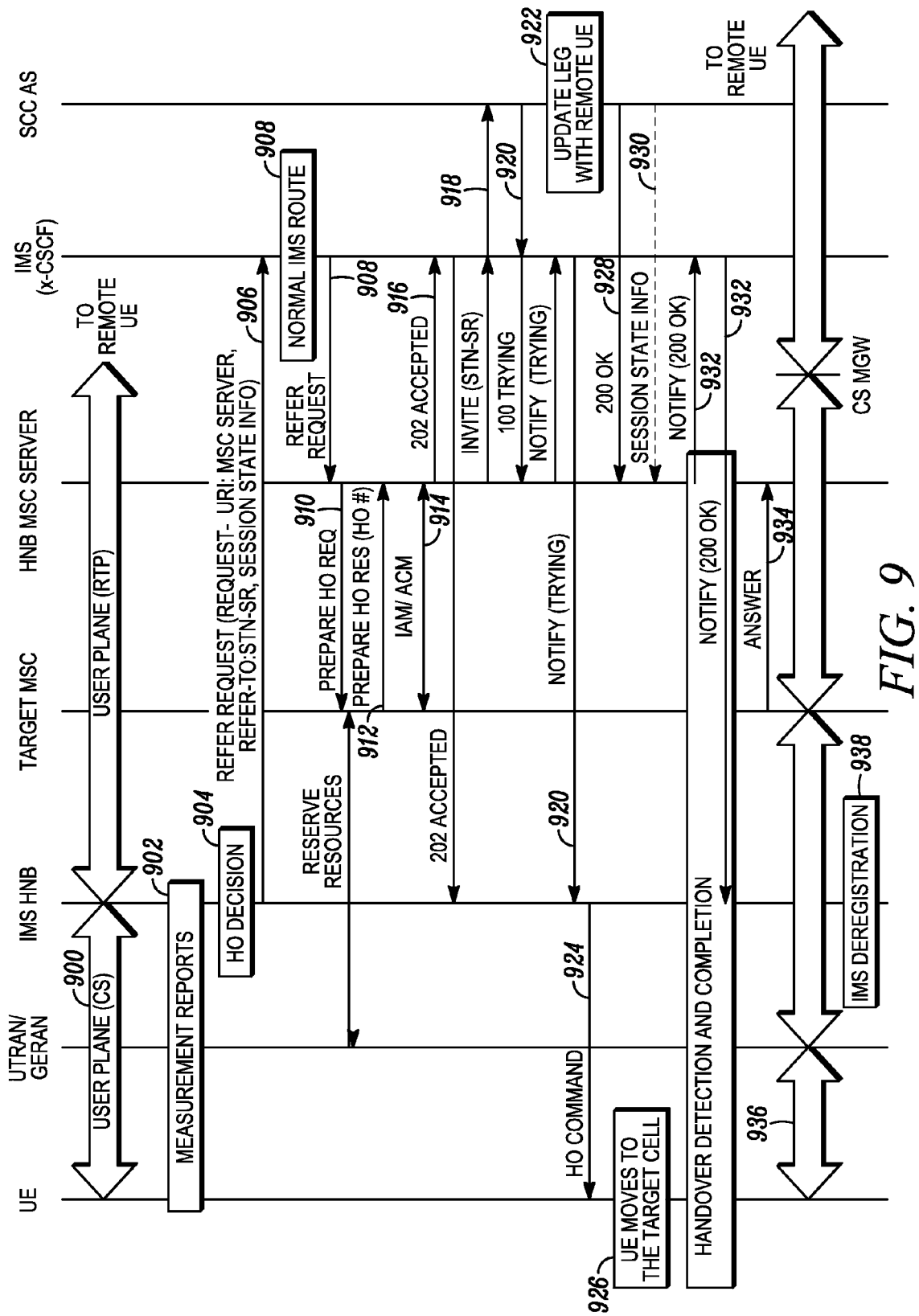
FIG. 9 is a diagram showing an example message flow for performing a handover of an ongoing voice call service according to the method shown in FIG. 8 in the communication system of FIG. 2.

Referring now to FIG. 9 which shows the main steps involved when a voice call is handed over from an IMS HNB 218 to a UTRAN/GERAN macro cell supporting voice on CS domain. Similar steps are used when the UE has a voice call and a non-voice component (in the PS domain) concurrently. This is further explained in the steps below.

The UE 220 has an ongoing voice call established with a remote UE through the IMS HNB 218, step 900. The IMS HNB 218 is configured with a list of neighbouring cells e.g. macro cells of UTRAN/GERAN (as specified in TS 25.467 [Rel-8], the disclosure of which is incorporated herein by reference) and instructs the UE 220 to measure the neighbour cells and transmit measurement reports as per the normal procedures specified in TS 25.331 (the disclosure of which is incorporated herein by reference), step 902. For example by measuring the signal strengths and/or quality of any signals received by the UE 220 from the neighbouring cells, the UE can determine which cells are available for communication. For example, only those cells with signals measured to be of sufficient strength to support a voice call would be able to route services successfully to and from the UE 220.

Based on the measurement reports and on other implementation-based criteria, the IMS HNB 218 decides to handover the ongoing call to a neighbouring macro cell (either UTRAN or GERAN) (e.g. macro cell 204 in FIG. 2), step 904.

The IMS HNB 218 sends a SIP REFER request message to the HNB MSC server 209, step 906. This SIP REFER request message includes identification information of the ongoing service by means of the Session Transfer Number for Single Radio Voice Call Continuity (STN-SR) for this UE (which can be received by IMS HNB 218 during the IMS registration), as well as other handover parameters, such as Session State Information and the target UTRAN/GERAN cell identity information, which are required to complete the handover. The Session State Information includes information that is required in order to synchronize the call state machine in the UE 220 and in the HNB MSC server 209. The REFER request message is routed to the HNB MSC server 209 with normal IMS routing procedures, step 908.

According to the normal SIP procedures (see RFC 3515), the REFER request message creates an implicit subscription to the refer event and the HNB MSC server 209 is subsequently expected to send NOTIFY requests to the IMS HNB 218 in order to report the progress of the refer event.

Based on the target cell identity received from the IMS HNB 218, the HNB MSC server 209 determines whether the target cell is controlled by another MSC, referred to as the target MSC or is controlled by the HNB MSC server 209. The target MSC does not implement any enhancements specific to the IMS HNB. When the target cell is controlled by the HNB MSC server 209, there is no need for a target MSC to be involved (i.e. the HNB MSC server 209 may perform also the role of the target MSC).

In the example flow shown in FIG. 9, the target cell is controlled by another MSC (referred to as the target MSC), for example, the MSC 208 shown in FIG. 2. The HNB MSC server 209 starts a normal inter-MSC handover procedure (as per TS 23.009, the disclosure of which is incorporated herein by reference) by sending a Prepare HO Request message to the target MSC, step 910. The target MSC prepares the appropriate resources in the target cell and responds with a Prepare HO Response including a HO number. Subsequently, a call is setup towards the HO number with the normal IAM/ACM ISUP messages, step 914.

The HNB MSC server 209 responds to the REFER request message with a 202 Accepted response, step 916. This is an indication to the IMS HNB 218 that the handover request has been accepted and is being processed.

The HNB MSC server 209 starts the normal IMS session transfer procedure (as per TS 23.237, the disclosure of which is incorporated herein by reference) by sending an INVITE request to the STN-SR received from the IMS HNB 218. This request is routed to the SCC AS, step 918.

The SCC AS starts updating the IMS leg with the Remote UE so that the addresses of the voice packets are changed so that they are sent to the CS domain media gateway (CS MGW) rather than the IMS network 214, as per TS 23.237, step 922. In parallel, the 100 Trying response from the SCC AS triggers the HNB MSC server 209 to send a NOTIFY (Trying) message to the IMS HNB 218, step 920. This triggers the IMS HNB to send a HO Command to UE 220 that contains the target cell identity, step 924.

The UE 220 then moves to the target cell, step 926.

The updating of the IMS leg with the Remote UE is completed and the SCC AS responds with a 200 OK, step 928. The SCC AS may send Session State Information to the HNB MSC server 209, as per TS 23.838 v1.1.0, step 930. It is noted that Session State Information may be sent to the HNB MSC server 209 either in step 906 by the IMS HNB 218, or in step 930 by the SCC AS.

In addition, the HNB MSC server 209 sends a session complete NOTIFY (200 OK) message to the IMS HNB 218 to report that the session transfer initiated by the REFER request message in step 906 is completed, step 932.

When the handover is completed, the target MSC sends an Answer message to HNB MSC server 209 at step 934, which triggers the user plane redirection.

The new user plane path is established at step 936.

The IMS HNB 218 may start the IMS Deregistration via IMS deregistration element 509 after receiving the NOTIFY (200 OK) at step 938.

Although the examples described above are described in relation to a voice call service, it will be appreciated that the message flows shown will be similar for other services, such as fax and messaging services.

It is noted that the term 'cell' as used herein is not intended to limit the disclosure to a cellular communication system but should be interpreted broadly as meaning a communication area served by one or more base stations such that a communication device located anywhere in the communication area or cell may communicate with at least one of the one or more of the base stations.

It will be appreciated that the core network 206 may manage additional or alternative radio access networks RANs to the UTRAN 202. Examples of other RANs include GSM access network (including GSM/EDGE RAN (GERAN)), CDMA 1X, CDMA EV-DO, HSPA (HSDPA/HSUPA) access networks, WLAN access network, Wi-Max access network, Evolved-UTRAN (E-UTRAN). Each of the RANs may include CS elements and PS elements.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A method of identifying a cell accessible to a communication device for communication and of providing a service to the communication device via the identified cell in a communication system having a plurality of cells arranged in a plurality of location areas, each location area including at least one macro cell served by a base station and at least one private cell served by a private base station, the base station being controlled by a Mobile Switching Centre, MSC, the at least one private cell being arranged for providing a communication link between the communication device and an IP Multimedia Subsystem, IMS, network, the method comprising:

when the communication device is in an idle mode in a location area having a private base station by which the communication device is registered with the IMS network, receiving an invitation for initiating a service with the communication device at the private base station;

in response to receiving the invitation, sending by the private base station paging messages for the communication device via the private cell served by the private base station and an invite message to the MSC;

in response to receiving the invite message, sending paging messages by the MSC for the communication device via the at least one macro cell;

receiving a response to the paging message from the communication device, the response being received via the private cell or the at least one macro cell, the private cell or the at least one macro cell then being identified as a cell accessible to the communication device for communication; and providing the service to the communication device via the identified cell.

2. The method of claim 1, wherein receiving a response to the paging message from the communication device comprises receiving a response via the private base station, when the communication device is located in the private cell, the private cell then being identified as a cell accessible to the communication device, wherein the method further comprises:

sending by the private base station to the MSC a cancel message to terminate the sending of paging messages by the base station of the at least one macro cell; and communicating, by the private base station, set up signals with the communication device to set up communication resources between the communication device and the private base station of the identified cell in order to provide the service to the communication device.

3. The method of claim 1, wherein receiving a response to the paging message from the communication device comprises, when the communication device is located in the at least one macro cell, receiving a response via the base station of the at least one macro cell, the at least one macro cell then being identified as a cell accessible to the communication device, wherein the method further comprises:

sending, by the MSC to the private base station in response to receiving the response from the communication device, a cancel message to terminate the sending of paging messages by the private station; and communicating, by the MSC, set up signals with the communication device to set up communication resources between the communication device and the base station of the identified cell in order to provide the service to the communication device.

4. The method of claim 1, wherein sending paging messages comprises sending paging messages when the UE is located in the same cell or when the UE has moved between cells controlled by the same MSC.

5. The method of claim 1, further comprising terminating sending paging messages from the private cell or the at least one macro cell when a response is received from the communication device via the other of the private cell or the at least one macro cell.

6. The method of claim 1, wherein the service request is received via the IMS network.

7. The method of claim 1, wherein the service request is a Mobile Terminating service request.

* * * * *